(12) United States Patent
Dogru

(10) Patent No.: US 10,822,925 B2
(45) Date of Patent: Nov. 3, 2020

(54) DETERMINING PRESSURE DISTRIBUTION IN HETEROGENEOUS ROCK FORMATIONS FOR RESERVOIR SIMULATION

(71) Applicant: Saudi Arabian Oil Company, Dhahran (SA)

(72) Inventor: Ali Haydar Dogru, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 393 days.

(21) Appl. No.: 15/963,251

(22) Filed: Apr. 26, 2018

(65) Prior Publication Data
US 2019/0330959 A1    Oct. 31, 2019

(51) Int. Cl.
*E21B 41/00*  (2006.01)
*E21B 47/06*  (2012.01)
*E21B 47/10*  (2012.01)

(52) U.S. Cl.
CPC .......... *E21B 41/0092* (2013.01); *E21B 47/06* (2013.01); *E21B 47/10* (2013.01)

(58) Field of Classification Search
CPC ...... E21B 41/0092; E21B 47/06; E21B 47/10; E21B 49/00; G06F 30/23; G06F 2111/10; G06F 17/13
See application file for complete search history.

(56) References Cited

U.S. PATENT DOCUMENTS

| | | | |
|---|---|---|---|
| 8,359,185 B2 | 1/2013 | Pita et al. | |
| 8,437,999 B2 | 5/2013 | Pita et al. | |
| 9,378,311 B2 | 6/2016 | Pita | |
| 2008/0167849 A1* | 7/2008 | Hales | E21B 43/00 703/10 |
| 2008/0208539 A1* | 8/2008 | Lee | G06F 30/23 703/1 |
| 2010/0094605 A1 | 4/2010 | Hajibeygi et al. | |

(Continued)

OTHER PUBLICATIONS

Guerillot, D. R., & Verdiere, S. (Jan. 1, 1995). Different Pressure Grids for Reservoir Simulation in Heterogeneous Reservoirs. Society of Petroleum Engineers. doi:10.2118/29148-MS.*

(Continued)

*Primary Examiner* — Saif A Alhija
(74) *Attorney, Agent, or Firm* — Bracewell LLP; Constance G. Rhebergen; Christopher L. Drymalla

(57) ABSTRACT

Computer system performance is improved during reservoir simulation runs where heterogeneous rock formations suffer from convergence problems. Convergence problems are affected by accurate determination of pressure distribution for reservoir simulation, which is very complex when properties or attributes of reservoir rock formations are heterogeneous. In heterogeneous reservoir rock formations, pressure distribution is affected over three dimensions by variations of rock permeability and porosity. The difficulty in convergence of the simulation runs results in increased computer operation and processing time and consequent computer usage costs. Improved determination of pressure distribution in heterogeneous rock formations permits acceptable initial pressure measures for pressure determination during reservoir simulation and to reduce convergence problems with existing reservoir simulation.

5 Claims, 9 Drawing Sheets

(56) References Cited

U.S. PATENT DOCUMENTS

| | | |
|---|---|---|
| 2011/0098998 A1 | 4/2011 | Lunati et al. |
| 2012/0010865 A1 | 1/2012 | Benson |
| 2012/0158380 A1 | 6/2012 | Hajibeygi et al. |
| 2013/0085730 A1 | 4/2013 | Shaw et al. |
| 2016/0342718 A1 | 11/2016 | Moyner et al. |

OTHER PUBLICATIONS

Dogru, Ali; "Equivalent Wellblock Radius for Partially Perforated Vertical Wells—Part I: Anistrophic Reservoirs With Uniform Grids"; SPE International, Saudi Arabian Oil Company, vol. 15, No. 4; Dec. 2010, pp. 1033-1043.

Olsen-Kettle, L.; "Numerical Solution of Partial Differential Equations", The University of Queensland, School of Earth Sciences, Centre for Geoscience Computing, pp. 1-108 http://research.uq.edu.au/researcher/768.

Saad, Y.; "Iterative Methods for Sparse Linear Systems" Chapter 10 "Preconditioning Techniques"; pp. 265-322.

International Search Report and Written Opinion for related PCT application PCT/US2019/029209 dated Sep. 10, 2019.

Wang et al., "Solver preconditioning using the combinatorial multilevel method on reservoir simulation", Computational Geosciences, 2015, pp. 695-708, Springer Publishing.

\* cited by examiner

DETERMINING PRESSURE DISTRIBUTION IN HETEROGENEOUS ROCK FORMATIONS FOR RESERVOIR SIMULATION

BACKGROUND OF THE INVENTION

1. Field of the Invention

The present involves reservoir simulation, and in particular simulation methodologies which take into account both fluid flow and pressure distribution in the reservoir during production of fluids.

2. Description of the Related Art

In the oil and gas industries, massive amounts of data are required to be processed for computerized simulation, modeling, and analysis for exploration and production purposes. For example, the development of underground hydrocarbon reservoirs typically includes development and analysis of computer simulation models of the reservoir. A realistic simulation model of the reservoir, and the presence of its fluids, helps in forecasting the optimal future oil and gas recovery from hydrocarbon reservoirs. Oil and gas companies have come to depend on simulation models as an important tool to enhance the ability to exploit a petroleum reserve.

The underground hydrocarbon reservoirs are typically complex rock formations which contain both a petroleum fluid mixture and water. The reservoir fluid content usually exists in two or more fluid phases. The petroleum mixture in reservoir fluids is produced by wells drilled into and completed in these rock formations. Sometimes, fluids such as water or gases are also injected into these rock formations to improve the recovery of the petroleum fluids.

Reservoir simulation belongs to the general domain of flow in porous media simulation. However, reservoir simulation normally involves multiple hydrocarbon components and multiple fluid phases in an underground geological formation which is under high pressure and temperature. The chemical phase behavior of these hydrocarbon fluids and the included groundwater has to be taken into account in these simulators.

The simulation models contain volumetric data which describe the specific geometry of the rock formations and the wells. The simulation models also contain reservoir properties data, such as the fluid and rock properties, as well as production and injection history pertaining to the specific reservoirs of the oil or gas field in question. The simulation models are formed by a simulator (known as a reservoir simulator) which is a suite of computer programs run on a data processing system.

The reservoir simulator which runs these models is a computer implemented numerical methodology, or coded algorithms and data constructs of an underlying mathematical model. The mathematical model which represents the physics of fluid movements in these hydrocarbon reservoirs is a system of nonlinear partial differential equations which describe the transient multiple-phase, multiple-component fluid flow. This model also represents material balance behaviors in these reservoirs induced by the production or injection of fluids, as well as the pressure-volume-temperature (PVT) relationships of the reservoir fluids.

A reservoir simulator simulates the multiphase multicomponent fluid flow and material balance in subterranean reservoirs and the included surrounding porous rock formations by subdividing the volume into contiguous cells, also known as grid blocks. In simulation models, the reservoir is thus organized into a number of individual cells. A cell or grid block is the basic finite volume where the underlying mathematical model is applied. The number of cells varies depends on the resolution needed for the simulation and the size of the reservoirs in question.

For a large reservoir, such as the type known in the industry as a giant reservoir, which may have multi-billion barrels of original oil-in-place (OOIP), the number of grid cells can be in the hundreds of millions to over a billion. This number of cells is required in order to have adequate resolution to represent flow dynamics, formation rock porosity and permeability heterogeneity, and many other geologic and depositional complexities within the reservoir. Simulation of this size reservoir can be termed giga-cell reservoir simulation. FIG. 1 shows at 100 an example structured reservoir grid model of a subsurface reservoir for reservoir simulation.

The challenges in hydrocarbon reservoir simulation require the use of the latest technology to maximize recovery in a cost-effective manner. Reservoir simulators such as those provided under the trademark GigaPOWERS have been described in the literature. See, for example articles by Dogru, A. H. et al, "*A Next-Generation Parallel Reservoir Simulator for Giant Reservoirs,*" SPE 119272, proceedings of the 2009 SPE Reservoir Simulation Symposium, The Woodlands, Tex., USA, Feb. 2-4, 2009 and by Dogru, A. H; Fung, L. S; Middya, U.; Al-Shaalan, T. M.; Byer, T.; Hoy, H. Hahn, W. A.; Al-Zamel, N.; Pita, J.; Hemanthkumar, K.; Mezghani, M.; Al-Mana, A.; Tan, J.; Dreiman, T.; Fugl, A.; Al-Baiz, A.; "*New Frontiers in Large Scale Reservoir Simulation,*" SPE 142297, Proceedings of the 2011 SPE Reservoir Simulation Symposium, The Woodlands, Tex., USA, Feb. 21-23, 2011. GigaPOWERS reservoir simulation is capable of fine-scale grid simulation that exceeds a billion-cell barrier for post-processing while utilizing hundreds of GB footprint per scenario.

The total number of simulation runs for a company with a number of hydrocarbon reservoirs and appreciable reserves exceeds multiple tens of thousands per year, and one or more petabytes of high performance storage is required to host these data.

The transient solution of the multiphase multicomponent system involves the evolution of mass and energy conservation in a sequence of time steps from the initial condition of the reservoir. For each time step, the system of nonlinear discrete equations for each finite volume is linearized using what is known as the generalized Newton's method.

In the industry, this is referred to as Newtonian iteration or nonlinear iteration. At each Newtonian iteration, a linear system of equations is constructed where the matrix, known as the Jacobian matrix, and the right-hand-side vector, known as the residuals are used to solve for the changes in the primary variables of the system.

Other factors about the reservoir further increased the complexity of giga-scale reservoir simulation. The subsurface rock in the formations is not homogenous in either permeability or porosity. For highly heterogeneous reservoirs, iterative methods may not converge in calculating reservoir pressure distribution. This introduces additional complexities to the simulation processing.

Current industry practice for solving the linear system of equations is via a preconditioned iterative method. An example of preconditioning is described, for example in Saad, Yousef, "Iterative Methods for Sparse Linear Systems," January, 2000, Ch. 10, pp. 265-319. The computationally expensive preconditioner methods increase the processing time required and thus the computational cost or reservoir simulation processing. Further, preconditioning methods do not guarantee convergence to an exact solution.

A preconditioner can generally provide a reasonable initial for the unknown pressure and saturation distribution within the reservoir. This initial estimate is then improved by iterations to the correct pressure and saturation distribution for the time step. The Gauss Seidel method is one method used as a preconditioner because of its simplicity and lower comparative computational cost per iteration. One such Gauss Seidel methodology is described, for example, in Olsen-Kettle, "*Numerical Solution of Partial Differential Equations*", Chapter 4.2, The University of Queensland. It has been found, however, that Gauss Seidel preconditioning often shows slow convergence and thus extended computation time, especially for reservoirs with highly heterogeneous permeabilities and porosities in the formations.

SUMMARY OF THE INVENTION

Briefly, the present invention provides a new and improved computer implemented method of reservoir simulation of fluid flow in a producing reservoir with improved convergence of determining pressure distribution within the reservoir to determine fluid flow in the reservoir. The reservoir has rock having heterogeneous properties of permeability and porosity. The reservoir further is organized into a three dimensional (3D) grid of reservoir cells. The reservoir simulation is performed for a sequence of time steps based on fluid pressures from wells in the reservoir. The formation layers contain rock having heterogeneous permeability and porosity properties.

The computer implemented method determines fluid flow from the three dimensional grid of reservoir cells to the wells and well production rates of the wells. The computer implemented method forms an initial measure of pressure distribution in individual ones of the grid cells of the reservoir for time steps of the reservoir simulation based on at least one of the heterogeneous rock properties and distances of the individual ones of the grid cells from wells in the reservoir. A pressure distribution in the individual ones of grid cells of the reservoir for a time step of the reservoir simulation is then based on the formed initial measure of pressure distribution in the individual ones of the grid cells of the reservoir.

An estimated fluid flow rate in the grid cells of the reservoir is then determined for a time step of the reservoir simulation based on the determined an estimated pressure distribution in the grid cells of the reservoir. Next, a determination is made whether the determined fluid flow rate in the grid cells of the reservoir has converged. If so, the reservoir simulation of fluid flow in the grid cells of the reservoir is ended. If not, processing returns and repeats the steps of determining an estimated fluid flow rate in the grid cells of the reservoir for a time step of the reservoir simulation based on the determined an estimated pressure distribution in the grid cells of the reservoir, and determining whether the determined fluid flow rate in the grid cells of the reservoir has converged.

DETAILED DESCRIPTION OF THE PREFERRED EMBODIMENTS

Figure 1:
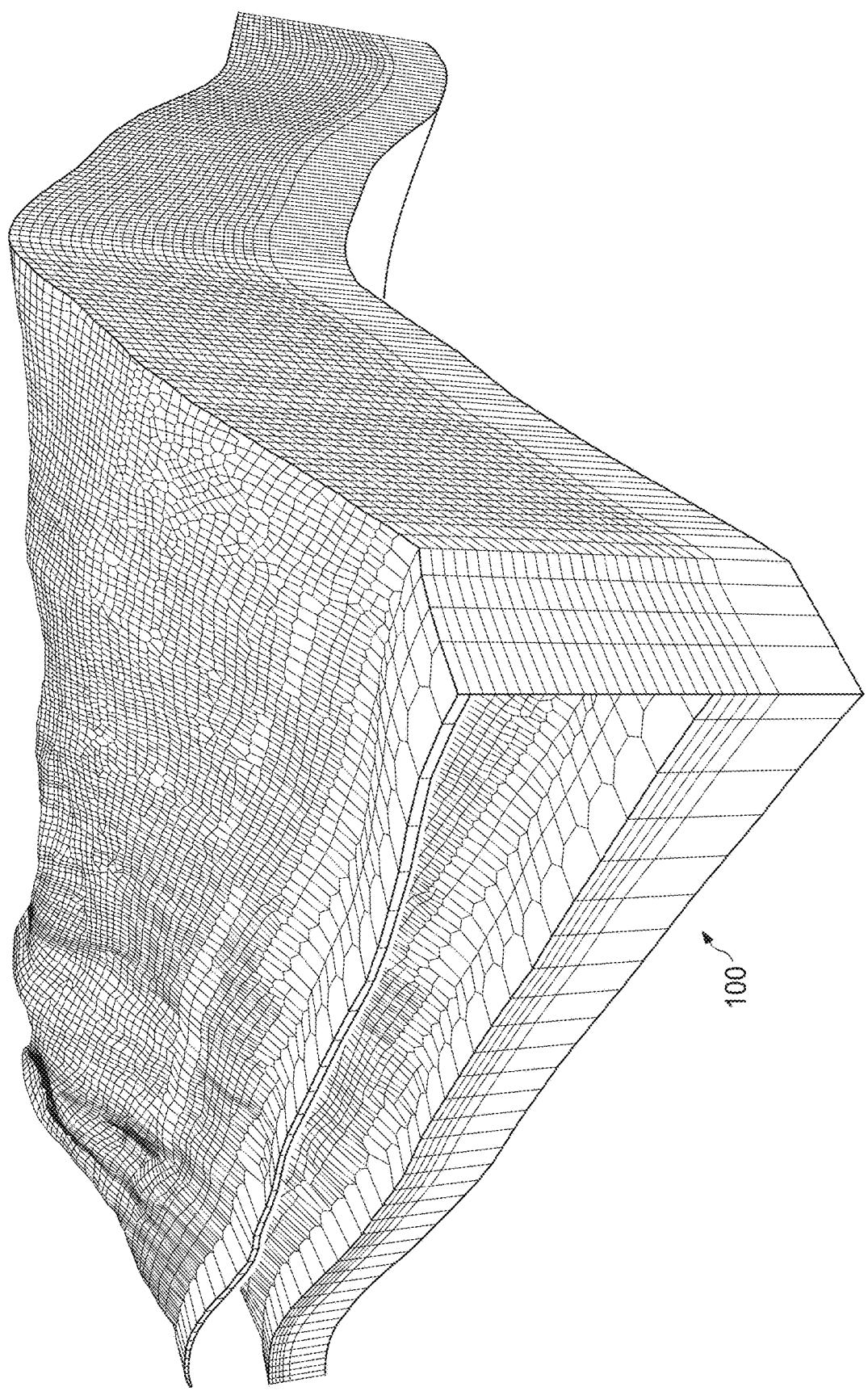
FIG. 1 is an isometric view of a computerized model of a subsurface reservoir structured grid for reservoir simulation.

In numerical reservoir simulation, based on the formulation, a pressure equation is formed either explicitly or included in the main body of the flow equations. Fluid velocities, and hence the flow of oil, water and gas is computed from the pressure distribution, hence the pressure fields must be computed properly. Often simulators face convergence problems due to difficulties in finding a proper pressure solution at a given time step. Therefore, correctly computed pressure solutions are critical for simulators to proceed in a time domain and determine reservoir performance with reasonable computational cost.

The present invention provides an improved methodology for determining pressure distribution within the reservoir to determine fluid flow in the reservoir, with improved convergence during the computer processing. This saves computational costs and solves a technological problem in the technological field of reservoir simulation. The present invention determines an accurate initial estimated measure for the unknown pressure distribution among the individual cells of a reservoir where it is known that the rock structure in the reservoir formations is heterogeneous. The present invention avoids the need to rely upon the time-consuming preconditioner condition of non-convergence likely to occur in the pressure distribution determinations using techniques such as the Gauss Seidel preconditioning for that purpose.

Underground fluid reservoirs are highly heterogeneous in rock properties. These heterogeneities are reflected in the coefficients of the partial differential equation describing the fluid flow and pressure distribution in the reservoir.

Nomenclature

Set forth below for ease of reference and understanding is a listing of the nomenclature used in the Equations which represent the various parameters, measurements and units of measure according to the present invention.

$\mu$=fluid viscosity, centipoise (cP)
$\rho$=fluid density, grams/cubic centimeter (g/cm$^3$)
p=pressure, lbs/in$^2$, (psi)
$\Phi$=fluid potential, barrels/day/psi (STB/d/psi)
q=well production or injection rate, barrels/day (b/d)
t=time
K=permeability tensor
k=absolute permeability of the reservoir rock, millidarcy (mD)
$k_{xx}$=Value of x directional rock permeability at any x location
$k_{xy}$=Value of x directional rock permeability at x and y location
$k_{xz}$=Value of x directional rock permeability at x and z location
Elements of permeability tensor K at y and z locations interpreted in a similar manner
x, y, z=space coordinate system
i, j, k=grid block index in x, y and z directions
$\varphi$=porosity
$\varphi_{ref}$=reference porosity
C=compressibility, per psi (1/psi)
Cp=Pore Compressibility
$C_L$=Liquid Compressibility
$C_o$=oil compressibility
$P_{ref}$=reference pressure
T=Transmissibility between grid blocks
A=Cross Sectional Area perpendicular to flow
$\Delta x$, $\Delta y$, $\Delta z$=Grid Block Size in x, y, z directions
$V_p$=Pore Volume
G=Green's Function
$\delta(a-b)$=Dirac's Delta function (=1 if a=b, otherwise=0)

The known pressure equation defining pressure conditions in a body such as a subsurface reservoir for a single phase or multiple fluid phases with pressure dependent fluid density can be written as below:

$$\nabla \cdot \frac{K}{\mu} \rho \nabla \Phi + \hat{q} = \frac{\partial \rho}{\partial t} \quad (1)$$

In Equation (1), K is a tensor of the reservoir parameter or attribute of rock permeability, defined as below:

$$K = \begin{bmatrix} k_{xx} & k_{xy} & k_{xz} \\ k_{yx} & k_{yy} & k_{yz} \\ k_{zx} & k_{zy} & k_{zz} \end{bmatrix} \quad (2)$$

For the rock permeability tensor K of Equation (1), heterogeneous rock permeability is taken into account by a three-dimensional matrix of measures of the permeability according to Equation (2). In Equation (2), k is the rock permeability, subscript x indicates the x direction, subscript y indicates y direction and subscript z indicates the z direction (vertical) in a three dimensional space.

In Equation (1), $\mu$ describes fluid viscosity; $\rho$ is the fluid density representing density of a single fluid such as oil, water or gas or an average density of the fluid mixture in the pore; $\phi$ represents rock porosity; $\hat{q}$ is the volumetric mass injection or production rate (well); and t represents the time. Fluid potential $\phi$ in Equation (1) is represented by Equation (3):

$$\Phi = p - \frac{g}{g_c} \bar{\rho} z \quad (3)$$

In Equation (3), p is the fluid pressure, g is the gravitational force and $g_c$ is the gravitational conversion factor, $\bar{\rho}$ is the average density between two spatial locations and z is the vertical distance from a reference point.

In Equation (1), $\nabla$ is the divergence operator and is defined by Equation (4) as follows:

$$\nabla = \frac{\partial}{\partial x}\vec{i} + \frac{\partial}{\partial y}\vec{j} + \frac{\partial}{\partial z}\vec{k} \quad (4)$$

In Equation (4), $\vec{i}$, $\vec{j}$ and $\vec{k}$ are the unit vectors in x, y, and z directions.

A number of physical properties or measures relating to a subsurface reservoir which are expressed in the discussion above are not constants, but rather dependent on pressure, temperature or other reservoir conditions.

For example, in Equation (1), $\Phi$ is the rock porosity and is defined by Equation (5) as follows:

$$\Phi(p) = \Phi_{ref} e^{-cp(p-p_{ref})} \quad (5)$$

In Equation (5), $\varphi_{ref}$ is the porosity measured at a reference pressure, $p_{ref}$ and $c_p$ is the pore compressibility measured in laboratory conditions, at constant temperature.

Similarly, fluid density $\rho$ is defined for fluids oil and water above the fluid mixtures bubble point pressure by Equation (6) as follows:

$$\rho_L(p) = \rho_{L,ref} e^{-cL(p-p_{ref})} \quad (6)$$

In Equation (6), $c_L$ is the liquid (oil or water) compressibility, and subscript L stands for liquid at constant temperature.

For gas reservoirs fluid density is defined by Equation (7) as follows:

$$\rho_g(p) = \frac{Mp}{RTZ(p,t)} \quad (7)$$

In Equation (7), M is the molecular weight of the gas, p is the gas pressure, R stands for universal gas constant, T is the absolute temperature and Z(p,T) is the gas deviation factor which can be obtained from laboratory or reference charts or by using equation of state calculations for a given gas composition.

The fluid potential $\Phi$ of Equation (1) defining pressure conditions in a subsurface reservoir is thus pressure dependent. To take this into account, Equation (3) is substituted into Equation (1), resulting in the following Equations (8a) and (8b):

$$\nabla \cdot \frac{K}{\mu} \rho \nabla (p - \tilde{\rho} z) + q = \frac{\partial \rho}{\partial t} \quad (8a)$$

$$\nabla \cdot \frac{K}{\mu} \rho \nabla p - \nabla \cdot \frac{K}{\mu} \rho \tilde{\rho} \nabla z + q = \frac{\partial \rho}{\partial t} \quad (8b)$$

In Equations (8a) and (8b), $\tilde{\rho}$ in the second term on the left hand side representing the flow due to gravity forces is defined as:

$$\tilde{\rho} = \frac{g}{g_c} \bar{\rho} \quad (8c)$$

This term is important for reservoirs, taking into account elevation differences and three dimensional effects in general.

Linearization the Pressure Equation (Equation (1))

Using the pressure depending property formulas of Equations (5) through (7), Equation (1) becomes Equation (9) as follows:

$$\nabla \cdot \frac{K}{\mu} \nabla \Phi + q = c_t \frac{\partial p}{\partial t} \quad (9)$$

For slightly compressible oil and water, Equation (9) becomes Equation (10) as follows:

$$\nabla \cdot \frac{K}{\mu} \nabla p - \nabla \cdot \frac{Kg}{\mu g_c} \bar{\rho} \nabla z + q = c_t \frac{\partial \rho}{\partial t} \quad (10)$$

In Equation (10), $c_t$ is the total pore compressibility including the rock (pore) and the fluids, and q is the volumetric production or injection rate. Equation (10) represents a "volume balance" relationship of pressure conditions in a subsurface reservoir as compared to Equation (1) which represents a "mass balance" relationship of subsurface reservoir pressure conditions.

For flat reservoirs, Equation (1) becomes Equation (11) as follows:

$$\nabla \cdot \frac{K}{\mu} \nabla p + q = c_t \frac{\partial p}{\partial t} \quad (11)$$

which is a linear partial differential equation. The interrelation between the numerous variables representing pressure conditions in a subsurface reservoir with pressure dependent fluid density are thus in a form in which it is possible to determine the pressure distribution in the reservoir by analytical solution for a given set of initial and boundary conditions.

For a diagonal tensor of the type expressed in Equation (2), and assuming only property changes in x, y, and z directions, a partial differential Equation (12) can be written representing pressure conditions in a body such as a subsurface reservoir according to Equation (11) as follows:

$$\frac{\partial}{\partial x} k_x \frac{\partial p}{\partial x} + \frac{\partial}{\partial y} k_y \frac{\partial p}{\partial y} + \frac{\partial}{\partial z} k_z \frac{\partial p}{\partial z} + q = c_t \frac{\partial p}{\partial t} \quad (12)$$

$$c_t = c_p + c_o$$

Discretization

An initial condition and boundary conditions are needed to determine the pressure distribution in the reservoir at any time t and location (x, y, and z) according to Equation (12). In order to solve Equation (12) for a given reservoir, the reservoir is divided into grid blocks, which can be rectangular boxes, and into time steps to cover the past reservoir history and future performance in time.

The following example and explanation of discretization assume a two dimensional flat reservoir. However, the methodology and principles applied are of general applicability and can be easily extended into a three dimensional system.

Assuming that reservoir such as that shown at 100 in FIG. 1 is divided into $N_x$ number of blocks in x direction and $N_y$ number of block in y direction and i represents the grid block number in x direction, i=1, 2, . . . $N_x$ and j=1, 2, . . . $N_y$ in y direction and 1 grid block in the z direction, Nz=1.

For any grid block located at grid coordinates (i, j) in the reservoir, finite volume discretization yields the following volume balance relationship expressed in Equation (13):

$$\sum_{i=1}^{N_x} T_{i-1/2,j}(p_{i-1,j}^{n+1} - p_{i,j}^{n+1}) + \quad (13)$$

$$\sum_{i=1}^{N_x} T_{i+1/2,j}(p_{i+1,j}^{n+1} - p_{i,j}^{n+1}) + \sum_{j=1}^{N_y} T_{i,j-1/2}(p_{i,j-1}^{n+1} - p_{i,j}^{n+1}) +$$

$$\sum_{j=1}^{N_y} T_{i,j+1/2}(p_{i,j+1}^{n+1} - p_{i,j}^{n+1}) = c_t V_{p_{i,j}} \frac{p_{i,j}^{n+1} - p_{i,j}^n}{\Delta t}$$

where T represents the interblock transmissibility between two neighboring grid blocks and defined as below.

In Equation (13), the superscript n represents the preceding or old time step, while the new or current time step is represented by the superscript n+1.

For example, between grid blocks (i−1,j) and (i, j) interblock transmissibility T can be expressed according to Equation (14) as follows:

$$T_{i-1/2,j} = \bar{k}_{i-1/2,j} A_{i-1/2,j} \frac{2}{(\Delta x_{i-1,j} + \Delta x_{i,j})} \quad (14)$$

where A is the surface area perpendicular to flow between the grid blocks and $\Delta x$ is the length of the grid block in x direction. The term $\bar{k}_{i-1/2,j}$ is a harmonically averaged interface permeability between grid blocks (i−1, j) and (i, j).

The pore volume $V_p$ of the grid block is defined by Equation 15 as follows:

$$V_{p_{i,j}} = \Delta x_{i,j} \Delta y_{i,j} \Phi_{i,j} \quad (15)$$

In Equation (13) pressures for each grid block $p^n{}_{i,j}$ are known (starting from an initial reservoir condition) at the start of production. Reservoir simulation is performed to compute the unknown pressures for the new time step (n+1), namely $p^{n+1}i,j$ for all grid blocks i=1, 2, ... $N_x$; j=1, 2, ... $N_y$.

For this purpose, Equation (13) is in matrix form for $N_x \times N_y$ grid blocks, using the proper boundary conditions (usually no flow from regions around the reservoir) and with given well rates $q_{i,j}$. Equation (13) yields an $N_x \times N_y$ linear system with a sparse coefficient matrix for the unknown pressures $p^{n+1}i,j$.

The linear system of Equation (13) is solved for the unknowns with several known types of iterative or direct methods (for smaller systems). Current industry practice for solving the linear system of equations is via a preconditioned iterative method.

However, as has been noted, for highly heterogeneous media in a reservoir, iterative methods may have difficulty in obtaining convergence in calculating reservoir pressure distribution. To prevent this, computationally expensive preconditioner methods have previously been used. So far as is known, however, these methods increase computational costs, and do not guarantee convergence of the pressure distribution determination for the reservoir cells to exact solution.

The Present Invention

The present invention improves functioning of the data processing system S in to solve this linear system of equations faster and determine pressure distribution for use in reservoir simulation. Many iterative methods require large cost to precondition the system which becomes computationally expensive. Several iterative methods will not converge to the solution for a given time step $\Delta t$, therefore, ending up reducing the time step number to a small number. Small time steps sizes can increase the total number of time steps to complete the simulation. However, this can be very expensive in terms of unnecessary computer usage and processing time and costs.

On the other hand other iterative methods require a close initial estimate of reservoir pressure for the determination of the unknown fluid flow. The present invention provides a pressure solution closer to the unknown solution, so that simple iterative methods can determine unknowns with less computational cost.

A single phase pressure equation is selected for demonstration purposes. The present invention provides a new approximate initial pressure estimate for the linearized pressure equation with highly heterogeneous coefficients. Numerical examples are presented below to demonstrate that the present invention can solve the pressure equation effectively by reducing the numerical error per iteration an order to several orders of magnitude compared to a basic iterative solver.

Solution Structure for Initial Estimate of Reservoir Pressure

Reservoir simulation models usually implement no flow boundary conditions at the boundaries of the reservoir. Wells provide an inner boundary condition. The present invention provides an improved methodology for an initial estimate of reservoir pressure which covers such types of boundary conditions.

Figure 2:
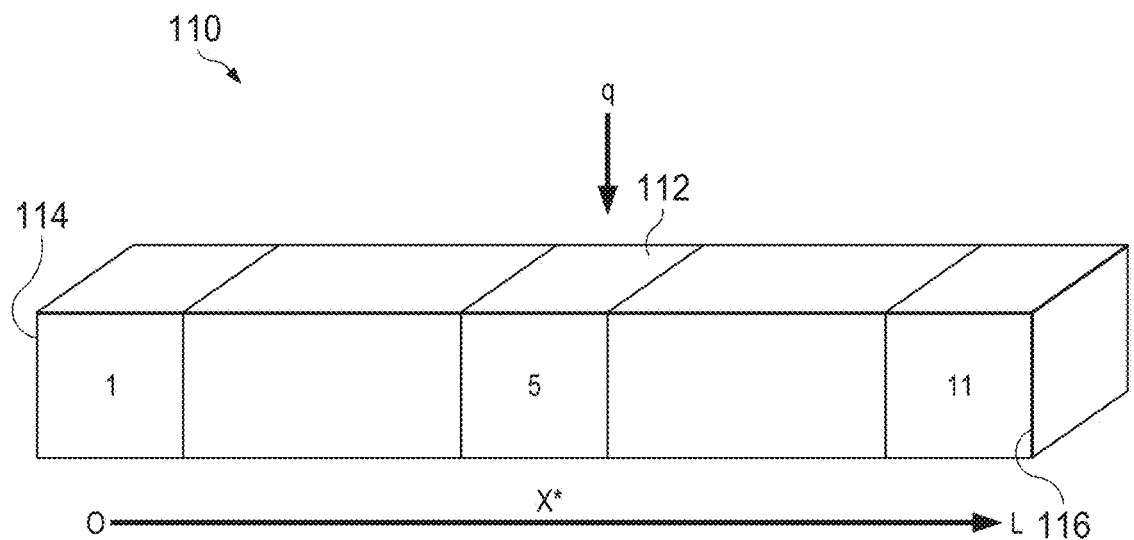
FIG. 2 is an isometric view of a one-dimensional reservoir model.

An illustrative example for fluid production and related rock properties of Equation (12) in conjunction with Equation (13) is presented. Consider for a simplified example (FIG. 2) a one dimensional linear porous media 110 (a simplified reservoir) with constant permeability, constant porosity, flow cross sectional area, and constant fluid viscosity. In FIG. 2, the porous media 110 has a length L along a linear or x dimension, and a well 112 at location at $x^*$ located between x=0 and x=L. Both an east boundary 114 at x=0 and a west boundary 116 at x=L are considered sealed (no flow).

By discretizing the time derivative and leaving the space derivatives at the new time level (n+1), Equation (12) becomes:

$$\frac{\partial^2 p}{\partial x^2} + \delta(x - x^*) q \frac{\mu}{k} = \frac{\phi \mu c_t}{k} \frac{\partial p}{\partial t} \quad (12a)$$

Removing the source term results in:

$$\left\{\frac{\partial^2 p}{\partial x^2}\right\}^{n+1} = \frac{\phi \mu c_t}{k} \left\{\frac{p^{n+1} - p^n}{\Delta t}\right\} \quad (16)$$

assuming $p^n = 0$, Equation (16) becomes:

$$\left\{\frac{\partial^2 p}{\partial x^2}\right\}^{n+1} = \frac{\phi \mu c_t}{k} p^{n+1} \quad (17)$$

Since no time derivative is involved, Equation (17) can be written in an ordinary differential equation format as Equation (18):

$$\left\{\frac{d^2 p}{dx^2}\right\}^{n+1} = \frac{\phi \mu c_t}{k} \left\{\frac{p^{n+1} - p^n}{\Delta t}\right\} \quad (18)$$

Defining $$a = \frac{\phi \mu c_t}{k},$$

Equation (18) results in Equation (19) as follows:

$$\frac{d^2 p}{dx^2} - ap = 0 \quad (19)$$

Equation (18) needs two boundary conditions to have a unique analytical solution. Considering the solution to the left of the source $x^*$, Left and Right Boundary Conditions $$\frac{dp}{dx} = 0 \text{ at } x = 0; \text{ or } x = L \quad (20)$$

At the left and right of the source $x^*$ the well production or injection flow q is thus:

$$q = -\frac{kA}{\mu}\left(\frac{dp}{dx}\right); x = x^* \quad (21)$$

Defining normalized variables results in Equations (22a) and (22b) as follows:

$$\bar{x} = \frac{x}{L}, x \leq x^* \quad (22a)$$

$$\bar{x} = \frac{x - x^*}{L - x^*}, x > x^* \quad (22b)$$

Approximate analytical solutions for Equation (18) for the porous media 110 of FIG. 2 and the above stated boundary conditions are as follows:

Left Solution, x≤x*:

$$P_L(\bar{x}) = \frac{\left(\frac{a_r}{a_r + a_l}\right)q\mu x^*\left(e^{\sqrt{a_L}\,\bar{x}} + e^{\sqrt{-a_L}\,\bar{x}}\right)}{kA(e^{\sqrt{a_L}} + e^{\sqrt{-a_L}})\sqrt{a_L}} \quad (23)$$

Right Solution, x>x*:

$$P_L(\bar{x}) = \frac{\left(\frac{a_l}{a_r + a_l}\right)q\mu(L - x^*)\left(e^{\sqrt{a_R}(\bar{x}-2)} + e^{\sqrt{-a_R}\,\bar{x}}\right)}{kA(1 - e^{-2\sqrt{a_R}})\sqrt{a_R}} \quad (24)$$

In Equations (23) and (24):

$$a_l = \frac{\mu x^*\left(e^{\sqrt{a_L}} + e^{\sqrt{-a_L}}\right)}{kA(e^{\sqrt{a_L}} + e^{\sqrt{-a_L}})\sqrt{a_L}} \quad (25)$$

$$a_r = \frac{q\mu(L - x^*)\left(e^{\sqrt{a_R}} + 1\right)}{kA(1 - e^{-2\sqrt{a_R}})\sqrt{a_R}} \text{ and} \quad (26)$$

$$a_R = \frac{\phi\mu c_t(L - x^*)^2}{k\Delta t} \quad (27a)$$

$$a_L = \frac{\phi\mu c_t(x^*)^2}{k\Delta t} \quad (27b)$$

and A is the cross sectional area to flow in Equations (14), (25) and (26).

Multiple Dimensions

A more complex reservoir model than that of FIG. 2 can now be considered. For a given time step, the unknown pressure p(x, y, z) for a porous medium of multiple dimensions (x, y, z) can be assumed to be the product of the solution in x, y and z directions. Since the pressure equation is linear, a product assumption for the solution can be used:

$$p(x,y,z) = p_x(x) \cdot p_y(y) \cdot p_z(z) \quad (28)$$

For an x direction pressure solution $p_x(x)$ is presented in Equations (23) and (24). A solution in the y direction, $p_y(x)$ is constructed similarly to Equations (23) and (24) except variables y, y* and $\bar{y}$ are used in place of the x variables. A pressure solution $p_{z(x)}$ is constructed similarly.

For purposes of simplification, the following discussion considers only x, y directions with no gravity effects. A complete three dimensional solution can be obtained by using Equation (28).

Multiple Wells and Superposition

The analytical solutions given by Equations (23) and (24) for a single well located at grid block k with a production or injection rate q by Equation (27a) can be abbreviated as follows:

$$p(x,q_k) = q_k G_k(x) \quad (27a)$$

For multiple wells, the solutions obtained due to a single source located at grid block k can simply be superposed as expressed in Equation (27b) below:

$$p(x,q_1,q_2,\ldots,q_i) = \sum_{k=1}^{n_w} q_k G_k(x) \quad (27b)$$

Calibration

In order to match an analytical solution to a numerical solution, a calibration has been found helpful. First, an average pressure $\bar{p}_{mbe}$ is determined according to Equation (28a) based on material balance conditions, as follows:

$$\bar{p}_{mbe} = \frac{\sum_{k=1}^{n_w} q_k \Delta t}{V_{p,t} c_t} \quad (28a)$$

In Equation (28a), $V_{p,t}$ is the total pore volume of the reservoir.

Average reservoir pressure $\bar{p}_{AS}$ for the analytical solution is determined according to Equation (28b), as follows:

$$\bar{p}_{AS} = \frac{\sum_{i=1}^{n} q_k \Delta t}{V_{p,t} c_t} \quad (28b)$$

The corrected analytical solution for pressure for numerical solution in successive ones of n iterations is set forth in Equation (28c) as follows:

$$p_i^{n+1,corr} = p_i^{n+1} \frac{\bar{p}_{mbe}}{\bar{p}_{AS}} \quad (28c)$$

$$i = 1, 2, \ldots n$$

Verification

For verification, a one simplified one dimensional reservoir with uniform rock and fluid properties such as the simplified model 110 (FIG. 1) is used. Equation (18) is discretized in space and time in a manner similar to Equation (19). This results in a linear system of equations with a tridiagonal coefficient matrix for the unknown pressures at each grid block for the new time step (n+1) as shown below in Equation (29):

$$\begin{bmatrix} T_{c,1} & T_{e,1} & 0 & 0 & 0 & & 0 & & 0 \\ T_{w,2} & T_{c,2} & T_{e,2} & 0 & & & 0 & 0 & 0 \\ 0 & T_{w,3} & T_{c,3} & T_{e,3} & 0 & 0 & & 0 & 0 \\ & & \cdot & \cdot & \cdot & \cdot & & & 0 \\ 0 & & 0 & & & & & & 0 \\ 0 & & & 0 & & & & & \cdot \\ 0 & & 0 & 0 & & & & & 0 \\ \cdot & & & & \cdot & \cdot & \cdot & & 0 \\ 0 & & & & 0 & 0 & T_{w,n-1} & T_{c,n-1} & T_{e,n-1} \\ 0 & 0 & 0 & & & & 0 & T_{w,n} & T_{c,n} \end{bmatrix} \quad (29)$$

$$\begin{bmatrix} p_1^{n+1} \\ p_2^{n+1} \\ \cdot \\ \cdot \\ \cdot \\ \cdot \\ \cdot \\ \cdot \\ p_n^{n+1} \end{bmatrix} = \begin{bmatrix} q_1 \\ q_2 \\ \cdot \\ \cdot \\ \cdot \\ \cdot \\ \cdot \\ \cdot \\ q_n \end{bmatrix}$$

In Equation (29) for any grid block i, Equations (30) and (31) below define the west neighbor transmissibility.

$$T_{c,i} = -\left(T_{w,i} + T_{e,i} + \frac{V_{p,i} C_t}{\Delta t}\right) \quad (30)$$

$$T_{w,i} = \bar{k}_{i-1/2} A_{i-1/2}\left(\frac{2}{(\Delta x_{i-1} + \Delta x_i)}\right) \quad (31)$$

The east transmissibility $T_{e,i}$ is defined similarly for the $i+\frac{1}{2}$ cell face.

Boundary Conditions

West and east end boundaries are assumed to exhibit no fluid flow. Therefore, $$T_{w,i} = 0, T_{e,i} = 0 \quad (32)$$

The well production or injection rates $q_1, q_2 \ldots q_n$ for a grid cell i are set forth in the right side of matrix Equation (29) above.

Equation (30) is solved for the first time step pressure distribution for the one dimensional reservoir by using Gaussian elimination or another suitable linear solver method.

Set forth below are an example set of parameter values for such a pressure distribution in a reservoir model of comparable dimensions to the model 110 of FIG. 2 organized into eleven grid blocks. Also included below are units of measure for these parameters which are applicable unless otherwise indicated for the models and examples given in the present application. The pressure distribution in the reservoir model is determined by both analytical solution and numerical solution to verify conformity between the analytical and the reservation simulation runs:

Reservoir Length: 1,000 ft.
Permeability: 100 mD
Porosity: 0.20
Total Compressibility, Ct = 15.e−6 1/psi
Fluid Viscosity = 1 cP
Number of grid blocks = 11
Well Located at grid block 6
Well Injection Rate = 500 b/d (barrels/day)
Time Step size (Dt) = 1 day
Initial pressure at the reservoir = 0. psi Table 1 shows the results of pressure distribution calculated by the analytical solution and numerical solution described above. The numerical solution was obtained by solving Equation (30) in the data processing system S.

TABLE 1

| Grid Block Number | Distance from left boundary, ft. | Pressure calculated by Analytical Solution, psi | Pressure Calculated by Numerical Method, psi |
|---|---|---|---|
| 1 | 45 | 426.2 | 426.5 |
| 2 | 136 | 442.9 | 443.2 |
| 3 | 227 | 477.1 | 477.3 |
| 4 | 318 | 530. | 530. |
| 5 | 409 | 603.8 | 603.6 |
| 6 | 500 | 701.3 | 700.8 |
| 7 | 591 | 603.8 | 603.6 |
| 8 | 682. | 530 | 530. |
| 9 | 773. | 477.1 | 477.2 |
| 10 | 864. | 442.9 | 443.2 |
| 11 | 955 | 426.2 | 426.5 |

Figure 6:
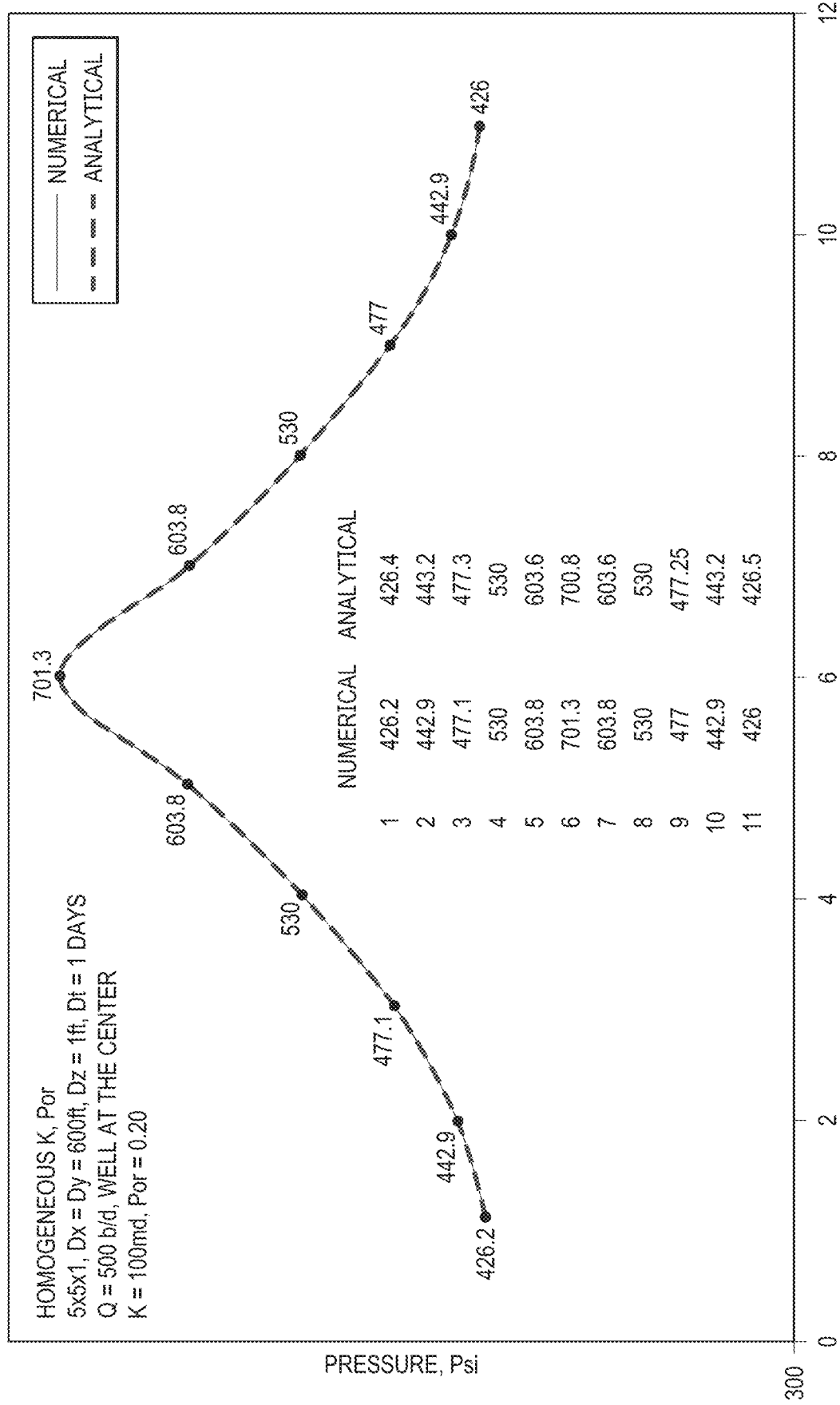
FIG. 6 is a display of comparative results of pressure distributions calculated by analytical solution and by numerical solution for the reservoir model of FIG. 2 with uniform or homogenous permeability and porosity for a one dimensional 11 grid block system.

Table 1 verifies that the proposed analytical solution yields a very close solution to the numerical solution. FIG. 6 is a display of comparative results of pressure distributions for a succession of simulation runs for time steps Dt of one day for a homogeneous permeability reservoir as calculated by analytical solution and by numerical solution for the reservoir model of FIG. 6 having the example set of parameter values identified above. The comparative results of the pressure distribution determination runs for the analytical solution and the numerical solution are so close as to overlap in the plot of FIG. 6.

Initial Pressure Determination for Heterogeneous Reservoirs

Reservoirs in nature are heterogeneous in rock properties such as permeability and porosity in the nature. For actual heterogeneous reservoirs, there is no analytical solution. A solution can only be obtained by numerical methods such as the one described by Equation (30). The present invention provides an initial pressure determination for heterogeneous reservoir rock properties of permeability and porosity using the same structure offered by Equations (23) and (24).

In determining the pressure at a location x with according to Equations (23) and (24), due to a source at x*, a harmonically averaged permeability $\bar{k}_{i,k}$ between x and x* is used, and a pore volume averaged porosity $\bar{\Phi}_{i,k}$ between the same two points is also used.

Assuming that well location x* corresponds to grid block k and location x has a grid block index i, the harmonically averaged permeability $\bar{k}_{i,k}$ can be expressed for each individual grid block i as:

$$\overline{k}_{i,k} = \frac{\sum_{j=1}^{k} \Delta x_j}{\sum_{j=1}^{k} \frac{\Delta x_j}{k_j}} \quad (33)$$

Similarly, for porosity, a pore volume averaged porosity $\overline{\Phi}_{i,k}$ can be expressed for each individual grid block i with constant cross sectional area A is as follows:

$$\overline{\phi}_{i,k} = \frac{\sum_{j=1}^{k} \phi_j \Delta x_j}{\sum_{j=1}^{k} \Delta x_j} \quad (33a)$$

Example for Heterogeneous Reservoir

The same example grid blocks used for the verification described above were adjusted to have heterogeneous permeability and porosity. In the model, it is assumed that the reservoir has one injector at the left end and one producer at the grid block 11 on the right, and with constant rates of 500 b/d injection and 300 b/d production. The reservoir permeability and porosity distributions among the eleven grid blocks are given in Table 2.

TABLE 2

| Grid Block No | Well rate | Permeability, mD | Porosity |
|---|---|---|---|
| 1 | 500 b/d injection | 100. | 0.20 |
| 2 | 0 | 10. | 0.05 |
| 3 | 0 | 50. | 0.20 |
| 4 | 0 | 30. | 0.10 |
| 5 | 0 | 10. | 0.25 |
| 6 | 0 | 100. | 0.27 |
| 7 | 0 | 500. | 0.06 |
| 8 | 0 | 10. | 0.10 |
| 9 | 0 | 300. | 0.16 |
| 10 | 0 | 500. | 0.10 |
| 11 | 300 b/d production | 60. | 0.15 |

Figure 7:
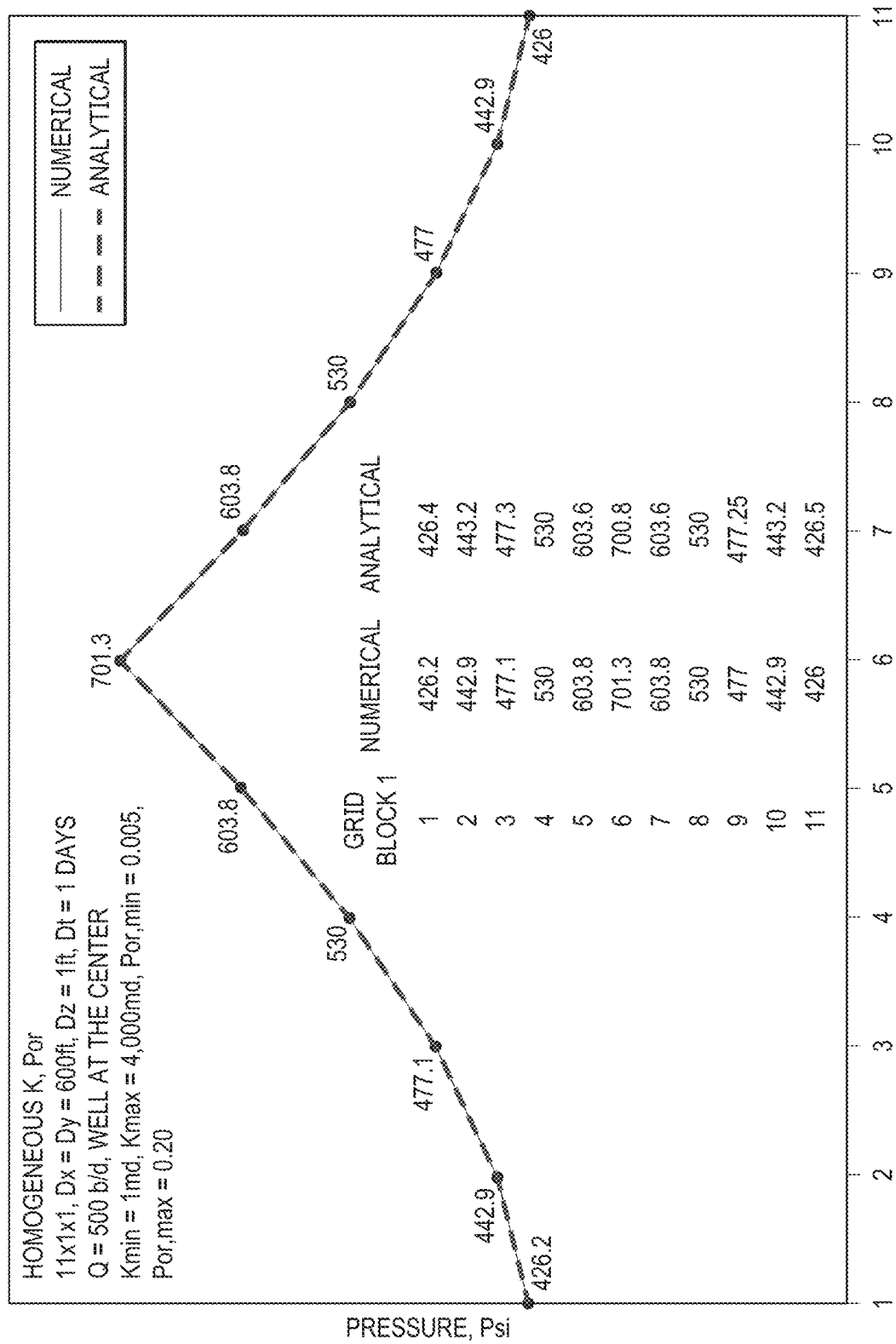
FIG. 7 is a display of comparative results of pressure distributions calculated by analytical solution and by numerical solution for the reservoir model of FIG. 2 with heterogeneous or varying permeability and porosity for a one dimensional 11 grid block system.

Pressure distributions were calculated by both the analytical solution and the numerical solution. Results of the pressure distribution runs for both the analytical solution and the numerical solution are plotted in FIG. 7. As seen, an analytical solution captures the numerical solution trend and yields a highly reasonable approximation.

Data Processing System

The processing and workflow described above are suitable for deployment on a variety of high performance computer (or HPC) cluster computer/processor node computer systems. These are typically rack mounted hardware with several compute nodes which contains multiple CPUs with multi-core architecture. Nodes are typically interconnected with conventional low latency high bandwidth networks, switches, and routers.

It should be understood that the present invention may be performed on a mainframe computer of any conventional type of suitable processing capacity such as those available from International Business Machines (IBM) of Armonk, N.Y. or other source.

Figure 3:
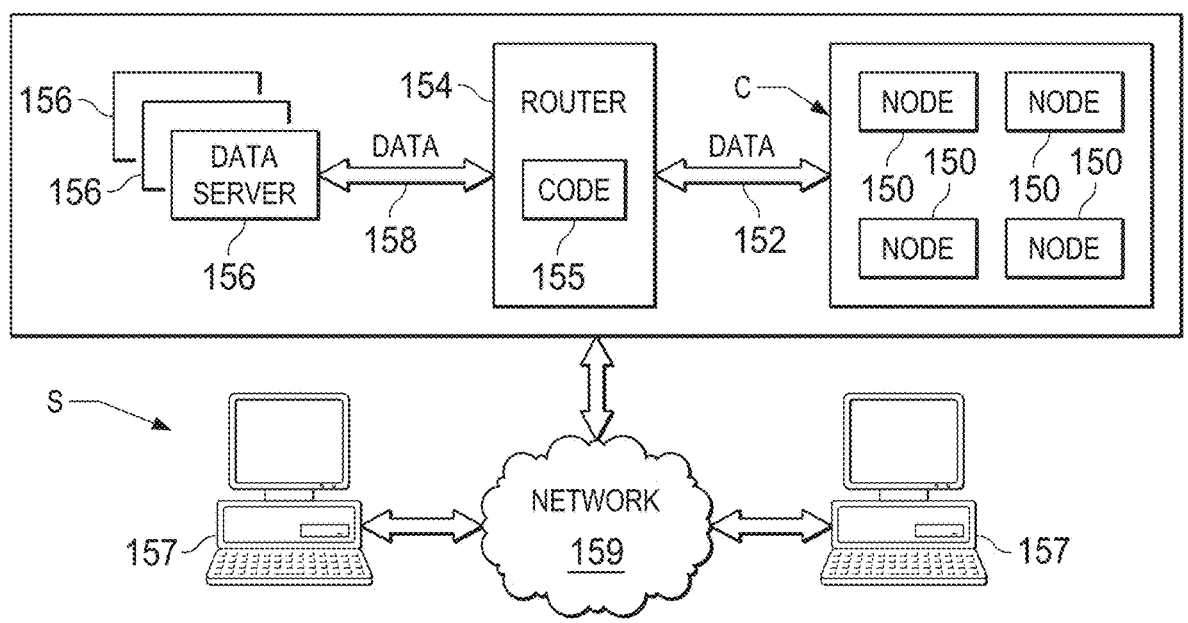
FIG. 3 is a schematic diagram of a computer network for determining pressure distribution in heterogeneous rock formations for reservoir simulation according to the present invention.
Figure 4:
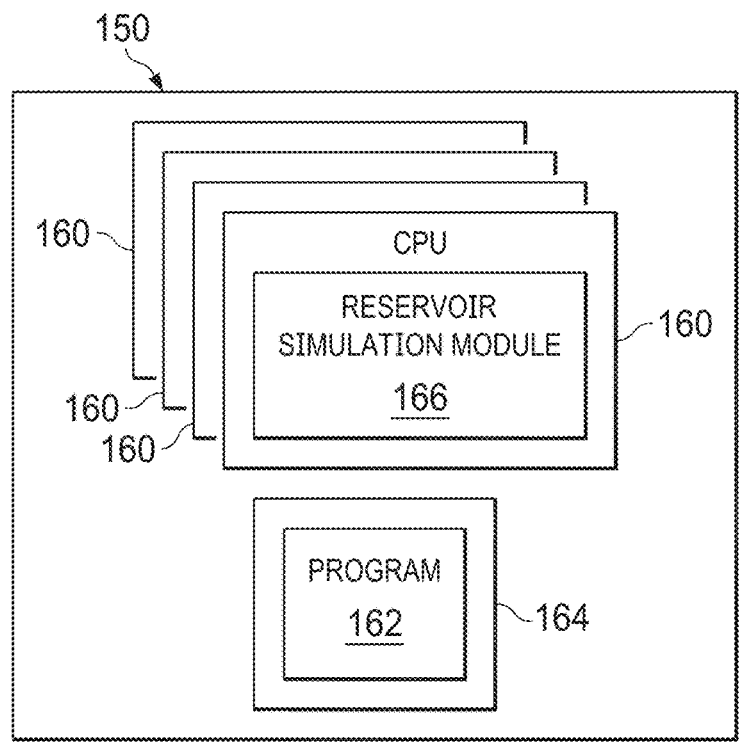
FIG. 4 is a schematic diagram of an application server or computer node of the computer network of FIG. 3.

The typical HPC environment for use with this simulation system is today's multi-node, multi-CPU, multi-core compute clusters. An example such cluster is illustrated at C in the data processing system S of FIG. 3. The cluster C is formed of a plurality of computer nodes 150 (FIGS. 3 and 4) which are provided with data in parallel as indicated by and arrow 152 by a router server or servers 154. If desired, several such router servers may be used for this purpose. Original simulation or input data of the types described above is stored in a suitable number of data storage/file servers 156. The data storage/file servers 156 store operating instructions, control information and database records for use by the data processing system S.

The router servers 154 operate under control of computer code 155 stored in memory and transfer input simulation data in parallel from the storage servers 156, as well as simulation processing results as indicated by an arrow 158, to and from the computer nodes 150 of the cluster C.

The program codes 155 according to the present invention is in the form of non-transitory computer operable instructions causing the server or servers 154 to index, order, process and transfer the reservoir simulation results. Typically, the data processing system S includes a set of work stations 157 of suitable, conventional type which are connected to the system by a network 159.

The computer nodes 150 of the cluster C include a plurality of processors or cores 160 of the type illustrated in FIG. 6 operating in parallel under instructions of a computer code or program product 162 stored in stored in memory 164 of the computer nodes 150. The program code 162 according to the present invention is in the form of non-transitory computer operable instructions causing the data processors 160 to perform reservoir simulation in reservoir simulation modules 166.

It should be noted that program codes 155 and 162 may be in the form of microcode, programs, routines, or symbolic computer operable languages that provide a specific set of ordered operations that control the functioning of the data processing system D and direct its operation. The instructions of program codes 155 and 162 may be stored in memory of the servers 154 or processor nodes 150, or on computer diskette, magnetic tape, conventional hard disk drive, electronic read-only memory, optical storage device, or other appropriate data storage device having a non-transitory computer usable medium stored thereon. Program code 160 may also be contained on a data storage device such as server 156 as a computer readable medium, as shown.

The Present Invention

The present invention provides improved determination of pressure distribution and pressure values over the three dimensions of heterogeneous rock formations of a reservoir such as the reservoir 100 (FIG. 1). The present invention further permits prompt initial pressure measures for pressure determination through the reservoir model during reservoir simulation for the subsurface reservoir 100. The present invention reduces convergence problems with existing reservoir simulation. The initial pressure distribution which is determined represents a correct pressure profile within the reservoir. The determined initial pressure in the reservoir is provided as input pressure measures for reservoir simulation by iterative methods.

The estimate of initial pressure is proven close to the actual solution based on analytical solutions in simplified reservoir models. The determined initial pressure estimate enables the reservoir simulator to converge to a desired solution within specified accuracy limits. Determination of the initial pressure distribution according to the present invention also converges with further computer processing iterations then other iterative determination methods. An example iterative determination method is Gauss Seidel methodology, which is described at: Olsen-Kettle, "*Numerical Solution of Partial Differential Equations*", previously mentioned. Gauss Seidel methodology was used as iterative method of determination of the initial pressure distribution for convergence time benchmark or comparison purposes.

Figure 5:
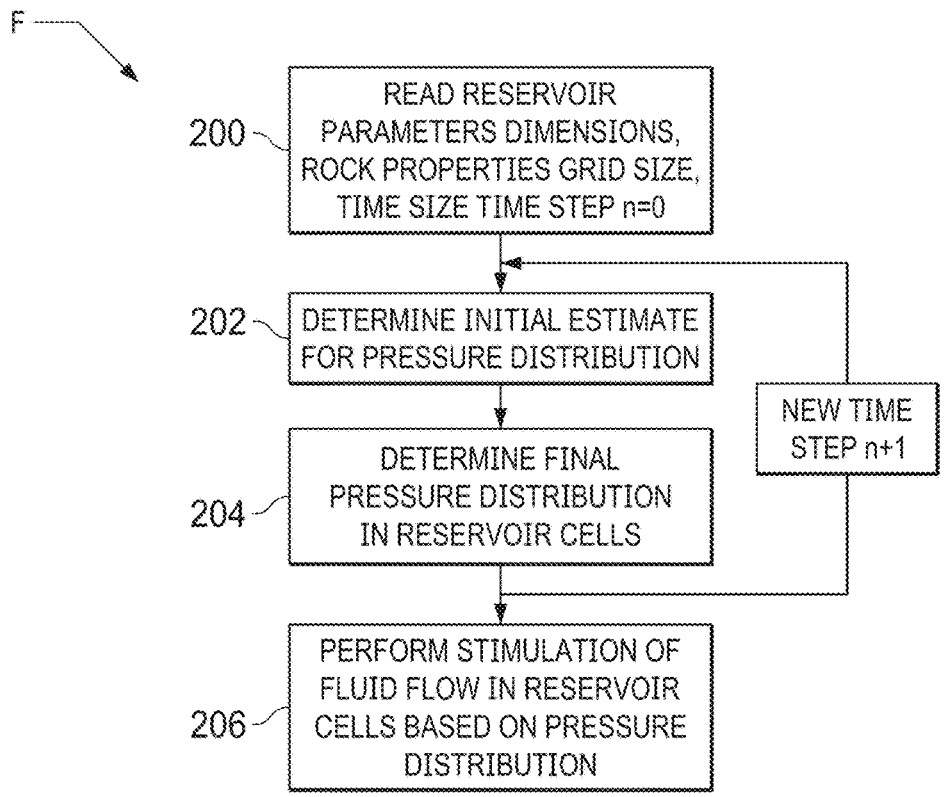
FIG. 5 is a functional block diagram or flow chart of workflow for determining pressure distribution in heterogeneous rock formations for reservoir simulation of the present invention.

FIG. 5 is a schematic diagram of a workflow F outlining a preferred embodiment of a sequence according to the present invention for reservoir simulation based on improved determination of pressure distribution over the three dimensions of heterogeneous rock formations of a reservoir.

During a step 200, simulation begins by reading the reservoir and production data. Reservoir and production data read in during step 200 are of the types discussed above. The reservoir simulator is also initialized during step 200, setting the simulation day and the time step to zero.

Reservoir data includes reservoir geometric information-its size, extent (length) in x, y, and z directions, reservoir properties such as permeability distribution, porosity distribution, thickness of layers, relative permeability data, capillary pressure data, fluid property data such as fluid density tables, formation volume factor tables, viscosity tables, location of wells, and location of well perforations within the reservoir.

Production data includes oil, water, and gas production rate measured or specified for the wells defined in the previous step. Production data also includes minimum bottomhole pressure for each well.

During step 202, pressure distribution for the cells of the reservoir model are determined solution using the same reservoir cell matrix structure offered by Equations (23) and (24). For the initial iteration of step 202 or time step n=1 of the reservoir simulation, the pressure change is set to zero. Improved determination of pressures according to the present invention in heterogeneous rock formations permits acceptable initial pressure measures for pressure determination during reservoir simulation and also reduces convergence problems with existing reservoir simulation.

During step 204, the determined initial pressures for the cells of the reservoir model resulting from step 202 are used to determine final pressure distribution in the reservoir cells organized in multiple dimensions as shown in Equation (28) to calculate the estimate for the pressure distribution for the next fluid flow reservoir simulation time step (n+1). The iterative solver methodology for is preferably of the Gauss Seidel type described above, although it should be understood that other iterative solvers may be used. Processing by the iterative solver during continues until convergence is achieved. The pressures so determined then are provided as part of the reservoir simulation during step 206 to determine fluid flow in the grid cells of the reservoir. The pressure distribution in the reservoir cells in the multiple dimensions determined during step 204 is then available for performance of step 206.

During step 206, the pressure estimate determined during step 204 is used in fluid flow reservoir simulation based on improved determination of pressures over the three dimensions of heterogeneous rock formations of a reservoir. The fluid flow reservoir simulation is determined in connection with an iterative solver of the conventional type to perform multiple iterations and determine pressures by numerical solution to be used as pressures at time step (n+1).

As will be set forth, the present invention provides improved determination of pressures in heterogeneous rock formations. The present invention permits acceptable initial pressure measures for pressure determination during reservoir simulation, and reduces convergence problems with existing reservoir simulation.

Simplified Reservoir Models Initial Pressure Distribution Determination Examples Comparative example cases of initial pressure determination for simplified reservoir models are presented: 1) a homogeneous reservoir; and 2) a heterogeneous reservoir.

For the two simplified models, a two dimensional flat square reservoir with the following properties was used as the reservoir model. The following chart sets forth reservoir parameters common to both examples.

Reservoir Dimensions: 3,000 ft. by 3,000 ft., thickness = 1 ft.
Reservoir Grid: Dx = Dy = 600 ft, Nx = 5, Ny = 5, Nz = 1
Pore Compressibility: Ct = 5e−6 1/psi,
Oil Viscosity: $\mu$ = 1 cP,
Injection flow q = 500 b/d injection at the center
Initial reservoir pressure p = 0 psi 1. Homogenous Reservoir Example For the homogenous reservoir example, the formation rock was assigned uniform heterogeneous properties of permeability=100 mD, and porosity=0.20. The time step for the simulation, Dt=15 days.

Figure 8:
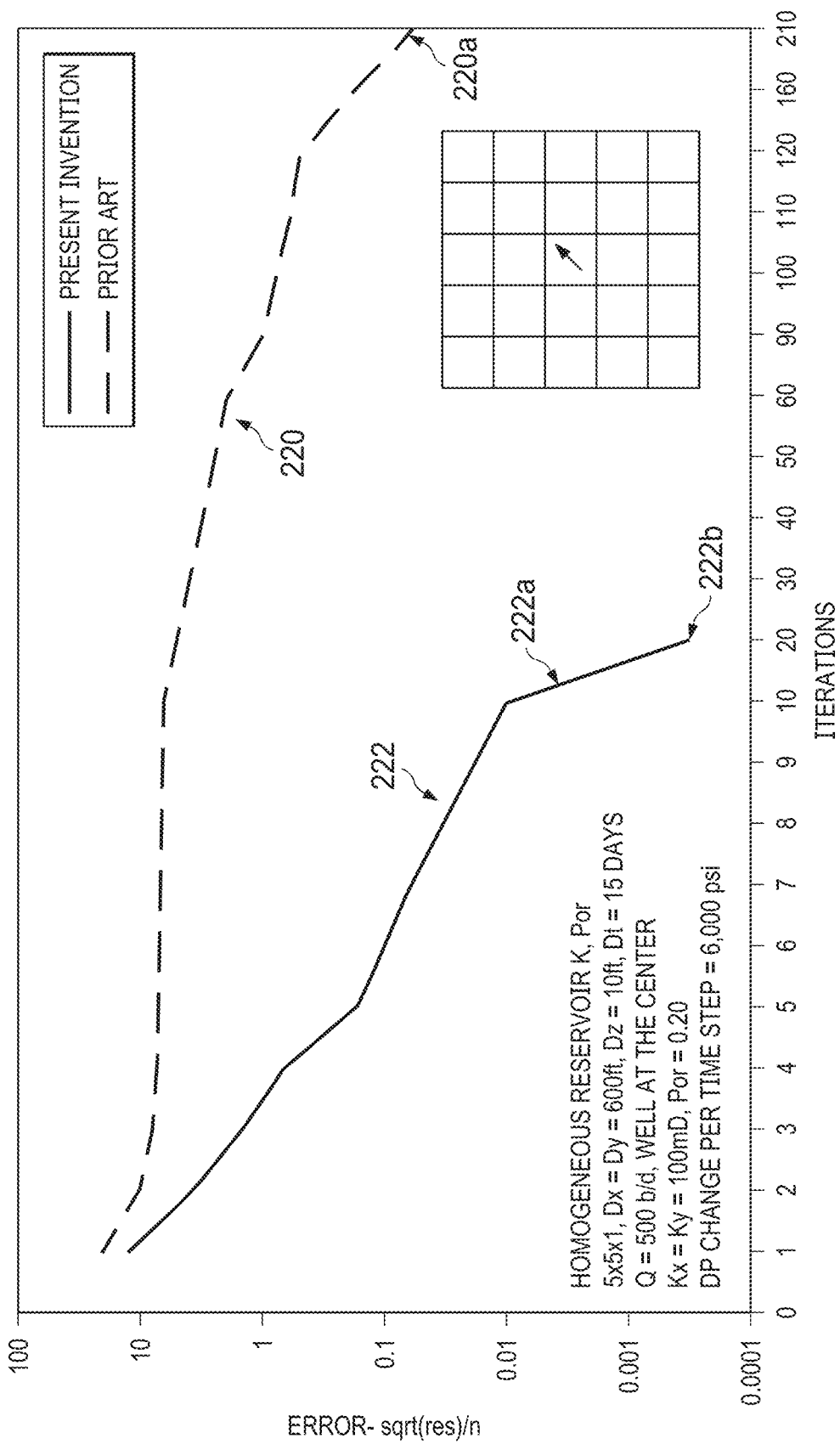
FIG. 8 is a display of comparative results of convergence error in pressure distribution determination according to the present invention against processing results according to the prior art for a two dimensional flat homogenous permeability reservoir model for a 5×5×1 areal grid system.

FIG. 8 is a display of comparative results of convergence error in pressure distribution determination according to the present invention against processing results according to the prior art for the selected two dimensional flat homogenous permeability reservoir model as defined by properties stated above. FIG. 8 shows an error in barrels per day averaged over the 25 grid blocks of the reservoir model versus number of fixed point Gauss Seidel iterations. FIG. 8 shows at 220 results of convergence as a function of iteration count a standard Gauss Seidel solution with zero pressure change as an initial estimate of the initial pressure gradient for the reservoir model. FIG. 8 shows at 222 results of convergence as a function of iteration count a standard Gauss Seidel solution with a pressure distribution initial estimate formed according to the present invention.

As can be seen from FIG. 8, the results shown at 222, pressure determination according to the present invention is superior to standard methods with a zero initial pressure estimate. Residual error is reduced to 0.01 b/d in 10 iterations as shown at 222*a* and 0.00001 b/d in 20 iterations as indicated at 222*b*. In contrast, standard processing method a shown at 220*a* requires 210 iterations to reduce the convergence error to 0.1 b/d, which is ten times the residual error from the present invention, and requiring more than twenty times the number of iterations than the present invention.

The convergence rate is thus much more rapid and the number of computer processing iterations is greatly reduced with the new present invention. It is also to be noted that conventional methods with a pressure estimate of zero yields much flatter curve as shown at 220 for relatively large time step sizes, indicating the residual is changing relatively little for a considerable number of iterations.

2. Heterogeneous Reservoir Pressure Example

A highly heterogeneous reservoir model was set up using the same grid dimensions for the same reservoir presented in the previous example. Permeability was varied randomly from 1 mD to 4,000 mD. Porosity was varied from ½ percent to 20 percent. The same time step size of 15 days was used.

Figure 9:
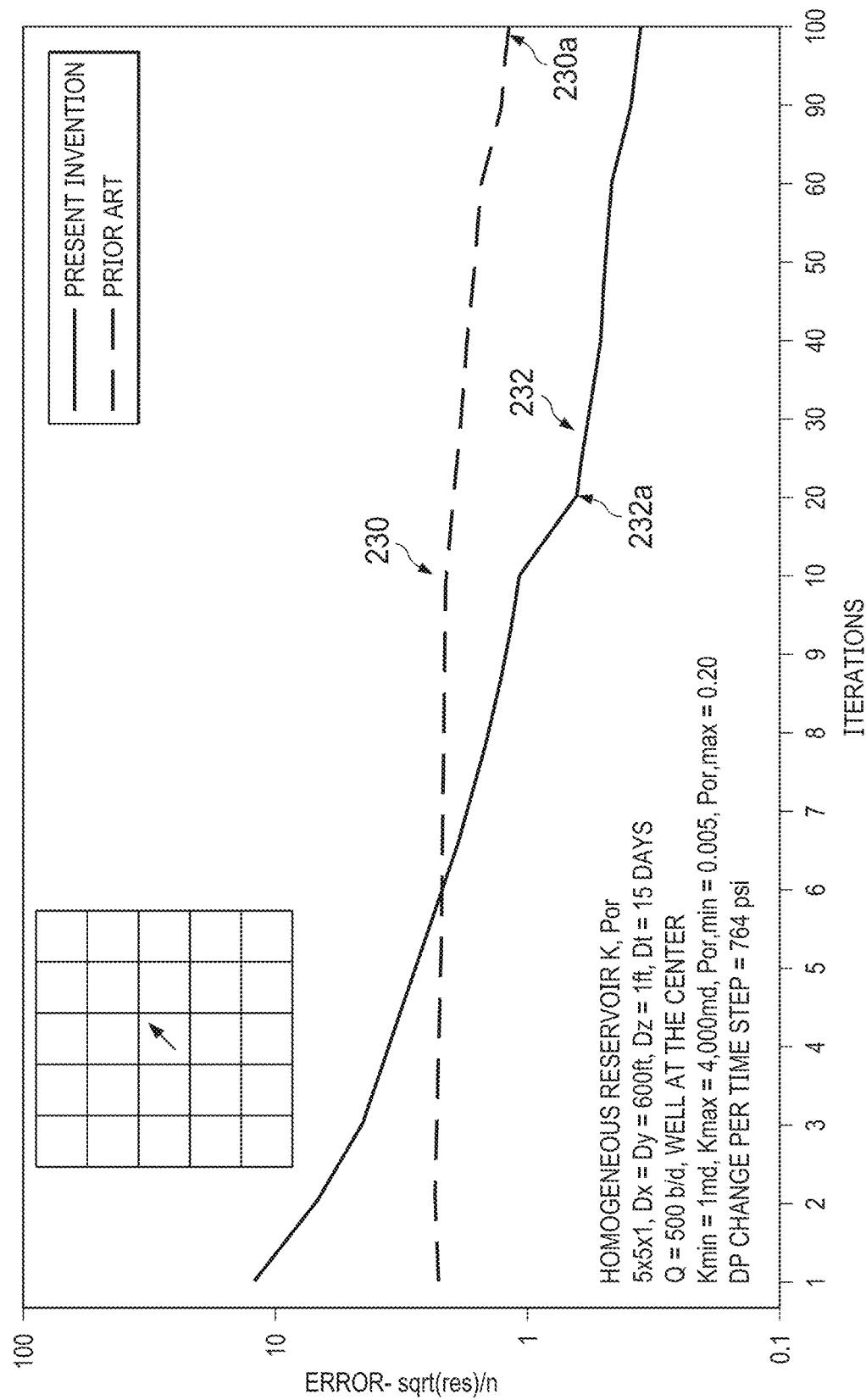
FIG. 9 is a display of comparative results of convergence error in pressure distribution determination according to the present invention against processing results according to the prior art for a two dimensional flat heterogeneous permeability reservoir model for a 5×5×1 grid system.

Results are displayed in FIG. 9. As shown at 230, the standard Gauss Seidel with zero as an initial estimate for the reservoir model yields during a continuing series of iterations an almost flat curve, indicating extreme difficulty in reducing the residual error. This is a typical performance of a non-preconditioned iterative method. On the other hand, as indicated 232, the present invention reduces the residual error systematically. The present invention as indicated at 232a reduces residual error for the heterogeneous model to less than ½ b/d in 20 iterations while as indicated at 230a the standard Gauss method has not reduced the error to 1 b/d in 100 iterations. Further iterations with the present invention converge to an exact solution at a given accuracy.

It is to be noted that as indicated in the legend of FIG. 9, the present invention accommodated an increase in pressure for the heterogeneous model of as much as 764 psi for a time step. This occurred with a time step pressure set constant of zero while determining a pressure distribution within the reservoir at 15 days (Dt=15 days) based on injection at the center well as shown in FIG. 9. The resulting pressure distribution within the reservoir-in these conditions was determined that to have increased from 0 to 764 psi. This is considered a significant and unusually large change in pressure in the context of reservoir simulation. Typical reservoir simulators, due to convergence problems, cannot take large time steps of sizes which would result from a pressure change of this magnitude. Rather, to avoid convergence problems, the reservoir simulators limit the time step size so that the maximum pressure change can remain within a much smaller pressure change, typically in the range of 100 psi. However, the reduced time step size increased the number of time steps and thus the computation time and cost of reservoir simulation.

Highly Heterogenous Reservoir Example: Estimation of Pressure Distribution

For a highly heterogeneous reservoir model, a two dimensional flat square reservoir with the following properties was used. The reservoir model lateral dimensions were 3,000 ft. by 3,000 ft., and thickness of 1 ft. The number of grid cells were selected to be $N_x=100$, and $N_y=100$, and grid cell dimensions were: $D_x=D_y=30$ ft, and $D_z=1$ ft. A well was located the center, injecting 50 b/d. Permeability was varied randomly among grid cells, varying between 5.e-4 mD to 100 mD, and porosity varied randomly between 2e-5 to 0.20. The time step Dt=1 day.

Table 3 below shows the performance of Gauss Seidel method with different Initial pressure estimates.

TABLE 3

| Case | Initial Pressure Estimate, psi (Constant for Reservoir and Wells) | Converged well Pressure, psi | Number of Iterations required | Residual of the equation at well grid block, b/d |
|---|---|---|---|---|
| 1 | 0. | 836. | 2,689. | 1.8e-5 |
| 2 | 500. | 848. | 4,907. | 1.7e-5 |
| 3 | 1000. | 848. | 5,772. | 4.3e-4 |
| 4 | 2000. | 848. | 6,600. | 1.8e-5 |

An analytical solution was used to generate the initial pressure estimate and the results are indicated in Table 4.

TABLE 4

| Case | Pressure Estimate at the well | Converged Well Pressure, psi | Number of Gauss Seidel Iterations | Residual at the well grid block, b/d |
|---|---|---|---|---|
| Analytical Solution | 725. | 847. | 848. | 3.e-5 |

As seen from the comparison of Table 3 and 4, Gauss Seidel iterations are sensitive to the pressure estimate assigned at the start of pressure determination, while the results obtained according to the present invention are closer to the actual solution. If the starting estimate is not properly chosen, the Gauss Seidel pressure determination persists closely to the initially selected pressure over continuing iterations and increased computer processing times.

As will be set forth, the present invention requires a much smaller number of iterations to find a solution. Gauss Seidel method can require excessive number of iterations if the initial estimate (usually unknown) is selected to be widely different from the actual solution, as Tables 3 and 4 illustrate. For example, as shown in Table 3 if the initial estimate is 2,000 psi it would take 6,600 iterations to reach the solution, while the present invention requires 8 times less the number of iterations.

Large Reservoir Example (Million Cell) Initial Pressure Determination

For a much larger reservoir model, a two dimensional flat square reservoir with the following dimensional properties was used as the reservoir model was used with lateral dimensions of 30,000 ft. by 30,000 ft., and with a thickness of 10 ft. The number of grid cells were selected to be $N_x=1,000$; $N_y=1,000$, and Nz=1. Grid cell dimensions were: $D_x=D_y=30$ ft, and $D_z=1$ ft. The total number of grid cells was thus one million.

The following formation data were assigned: pore compressibility Ct=5e-6 1/psi; oil viscosity=1 cP. Flow rate q was set at 1,000 b/d injection at the center. Initial reservoir was assigned pressure=0 psi. The time step Dt was established at 10 days.

Homogeneous Large Reservoir

As an example the larger reservoir model was assigned homogeneous permeability, $K_x=K_y=100$ mD for each grid cell, and homogeneous porosity=0.20. The other parameters were the same as in the previous examples.

A reservoir simulation was run by using the Gauss Seidel method again as a benchmark to determine grid cell pressure distribution at the end of the first time step (10 days). The processing of the present invention according to FIG. 10 was run.

Figure 10:
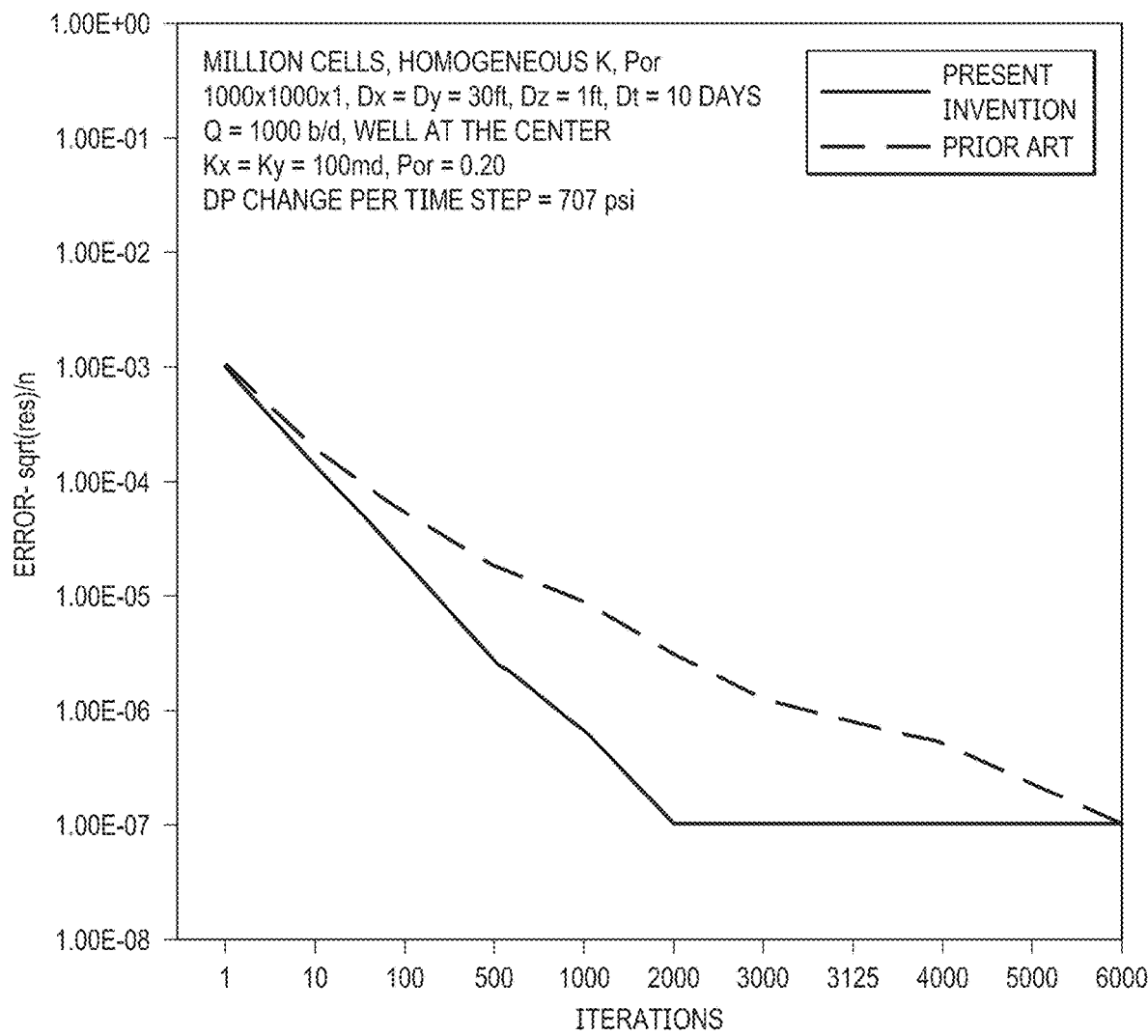
FIG. 10 is another display of comparative results of convergence error in pressure distribution determination according to the present invention against processing results according to the prior art for a two dimensional flat homogeneous permeability and porosity reservoir model for a million grid block 1,000×1,000×1 grid system.

FIG. 10 is a plot of comparative results of convergence error in pressure distribution determination according to the present invention against processing results according to the Gauss Seidel prior art benchmark for a two dimensional million cell homogenous permeability reservoir model. FIG. 10 illustrates the error reduction by the iterations. Both methods converged to the same pressure solution with a determined well bottomhole pressure of 707 psi and a residual error of 1.e-7.

Processing according to the present invention formed an initial estimate of the well bottomhole pressure as 221 psi and took 1,993 iterations to converge on the 707 psi well bottomhole pressure. The conventional Gauss Seidel benchmark with zero change as an initial estimate took 6,030 iterations to achieve the 707 psi well bottomhole pressure solution, or more than three times the number of processing iterations for one time step.

Heterogeneous Large Reservoir

The same reservoir dimensions and parameters as for the homogenous larger reservoir model described above were used for this example. However, random permeability and porosity distribution were assigned. Minimum permeability for the random distribution was 0.0001 mD, maximum permeability was 100 mD; and average permeability was 50 mD. Minimum porosity of =1e-7 was established; maximum porosity was =0.20, and average porosity was =0.10.

Figure 11:
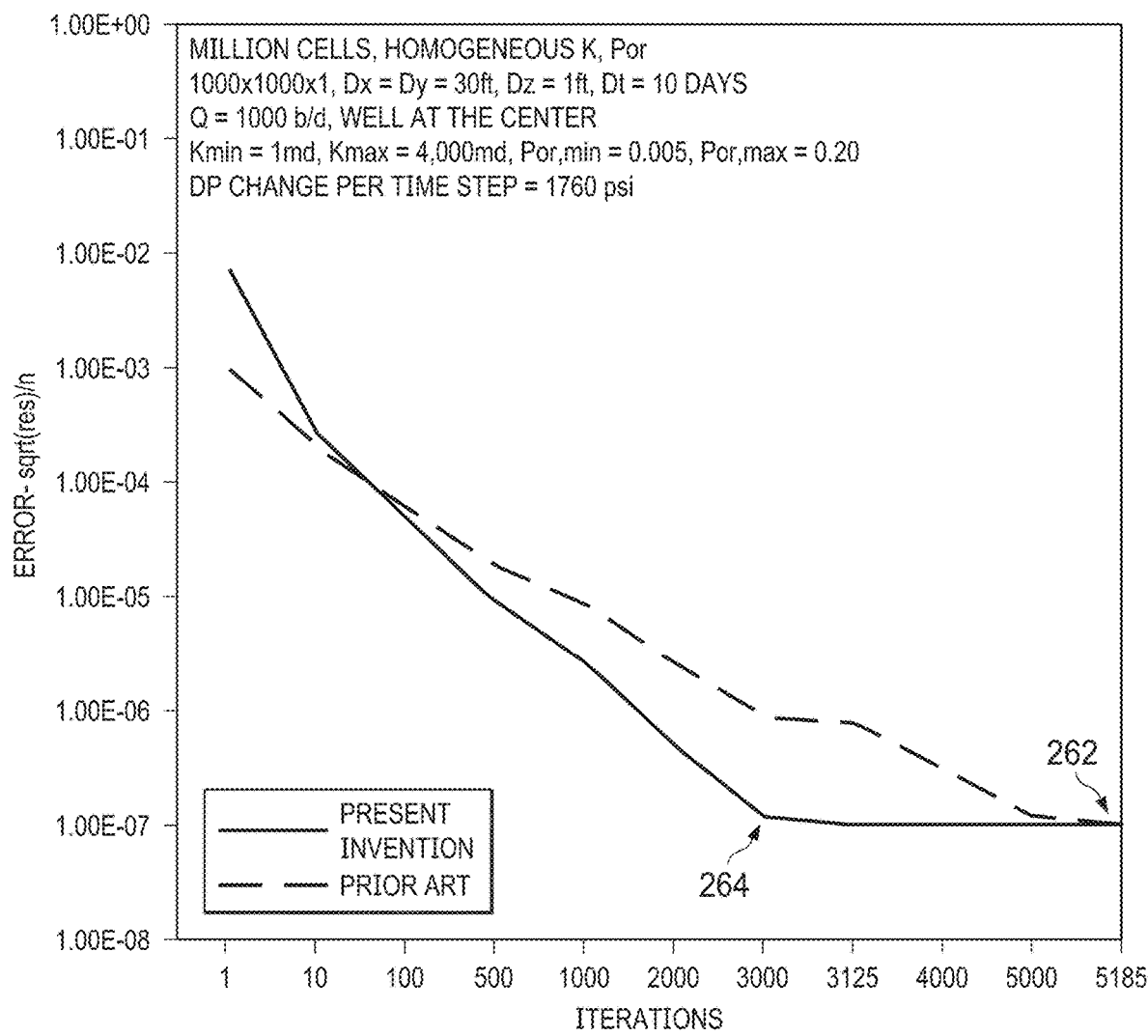
FIG. 11 is a display of comparative results of convergence error in pressure distribution determination according to the present invention against processing results according to the prior art for a large three dimensional heterogeneous permeability and porosity reservoir model a million grid block 1,000×1,000×1 grid system.

The present invention and the Gauss Seidel benchmark method were again run to calculate reservoir pressure distribution at the end of first time step and then compared. Performance of both methods is presented in FIG. 11. For the Gauss Seidel benchmark an initial estimate of well bottomhole pressure was 0 psi. Initial pressure determined according to the present invention was estimated at 1863 psi. As shown at 260, the Gauss Seidel benchmark converged to a well bottomhole pressure of 1764 psi with a residual error of 1.e-7. As shown at 262, the present invention converged to the same well bottomhole pressure of 1764 psi and residual error of 1.e-7 after significantly fewer iterations.

However, the Gauss Seidel benchmark required 5,185 to achieve convergence for the time step, while the present invention obtained the same results based on the determined initial pressure in 3,125 iterations, about 40% less processing time.

Reservoir Fluid Flow Determination

Matrix Equation (35) below can be used according to the present invention for consecutive time steps to obtain pressure values during step 204. As noted a constant pressure of zero is assumed for an initial step, which is identical to defining existing pressure as the difference from a constant initial pressure.

$$\begin{bmatrix} T_{c,1} & T_{e,1} & 0 & 0 & 0 & & 0 & & 0 \\ T_{w,2} & T_{c,2} & T_{e,2} & 0 & & 0 & 0 & & 0 \\ 0 & T_{w,3} & T_{c,3} & T_{e,3} & 0 & 0 & & 0 & 0 \\ & & . & . & . & & & & 0 \\ 0 & & 0 & & & & & & 0 \\ 0 & & & 0 & & & & & . \\ 0 & & 0 & 0 & & & & & 0 \\ . & & & & . & . & . & & 0 \\ 0 & & & & 0 & 0 & T_{w,n-1} & T_{c,n-1} & T_{e,n-1} \\ 0 & & 0 & 0 & & & 0 & T_{w,n} & T_{c,n} \end{bmatrix}$$ (35)

-continued $$\begin{bmatrix} p_1^{n+1} \\ p_2^{n+1} \\ . \\ . \\ . \\ . \\ . \\ p_n^{n+1} \end{bmatrix} = \begin{bmatrix} q_1 - \frac{Vp_1 c_t}{\Delta t} p^n 1_1 \\ . \\ . \\ . \\ \cdot q_i - \frac{Vp_i c_t}{\Delta t} p^n i \\ . \\ . \\ . \\ q_n - \frac{Vp_n c_t}{\Delta t} p^n n \end{bmatrix}$$

Assuming the right hand side vector of Equation (35) to be new source (well) terms, an analytical solution can be constructed by the superposition of the analytical solutions. Grouping the right hand side vector elements as:

$$\tilde{q}_i = q_i - \frac{Vp_i c_t}{\Delta t} p^n i_i \quad (36)$$

The superposition can be expressed in the following manner:

$$p(x, \tilde{q}_1, \tilde{q}_2 \ldots \tilde{q}_j)^{n+1} = \Sigma_{k=1}^n \tilde{q} k G_k(x) \quad (37)$$

Without improved determination of pressure distribution over the three dimensions of heterogeneous rock formations of a reservoir according to the present invention, the superposition presented in Equation (37) can be expensive due to the large number n of terms involved in the processing. This is especially for large scale simulation operations which almost certainly prove to be computationally expensive.

Reducing Computational Cost for Large Systems

Since the computational cost involved is in the evaluation of the analytical solution ($G_k(x)$) involving exponential terms contained in the pressure relationships expressed in Equations (23) and (24), an approximate radial solution to the pressure equation is presented.

Let $x^*$, $y^*$ be the x, y coordinate of a source (well) in the (x, y) grid. The radial distance between a point (x, y) and ($x^*$, $y^*$) can be defined by:

$$r(x,y;x^*,y^*) = \sqrt{(x-x^*)^2 + (y-y^*)^2} \quad (38)$$

Finding an average area of an equivalent radial system to $L_x L_y$ Cartesian system can be expressed as Equation (39):

$$r_e = \sqrt{\frac{L_x L_y}{\pi}} \quad (39)$$

The basic solution becomes one expressed in Equation (4):

$$G(r) = \frac{e^{-\sqrt{a}\, r}}{1 - e^{-2\sqrt{a}}} \text{ where} \quad (40)$$

-continued $$a = \frac{\phi\mu c_t(r_e - r^*)^2}{k_r \Delta t} \quad (41)$$

and r* is the radial coordinate of the source, and $k_r$ is the radial permeability calculated from $k_x$ and $k_y$.

Approximation to Exponential Function

The exponential expressions in Equations (23), (24) and (40) can be approximated by Equation (42):

$$e^x \approx 1+x \quad (42)$$

Depending on the value of x, Equation (42) should further reduce the computational cost for pressure estimate for large scale applications.

Parallel Computing

Since the analytical solution is expressed in closed form expressions, no dependency in the solution exists. This provides a significant advantage over the conventional solution methods which deals with dependency, or reclusiveness in the mathematical expressions. Therefore, the method presented here is highly parallelizable.

The present invention provides reservoir simulation based on improved determination of pressure distribution over the three dimensions of heterogeneous rock formations of a reservoir. It is adapted for and implemented in multiple dimensions. The present invention provides a good initial approximate solution to pressure distribution within the reservoir. Based on the determination of an initial approximate pressure, a simple iterative method then is performed to obtain the final pressure (exact) distribution.

It has been found that the that conventional Gauss Seidel processing methodology with no realistic initial pressure for heterogeneous reservoirs converges to different solutions than the actual depending on the starting pressure solution estimate. In contrast, the methodology of the present invention analytical solution converges to a correct and demonstrably accurate answer. Numerical experiments described above have shown that the present invention works well for two dimensional reservoirs, whether homogenous and heterogeneous.

Advantages of the present invention are twofold: the present invention develops a close estimate of pressure distribution for reservoir simulation. The iterative method used for reservoir simulation runs after determining an initial estimate of pressure distribution can be very simple. Therefore, the total process is attractive and cost effective. The present invention provides improved reservoir simulation based on improved determination of pressure distribution over the three dimensions of heterogeneous rock formations of a reservoir, and avoids prior problems with existing simulation techniques.

The invention has been sufficiently described so that a person with average knowledge in the field of reservoir modeling and simulation may reproduce and obtain the results mentioned in the invention herein. Nonetheless, any skilled person in the field of technique, subject of the invention herein, may carry out modifications not described in the request herein, to apply these modifications to a determined structure and methodology, or in the use and practice thereof, requires the claimed matter in the following claims; such structures and processes shall be covered within the scope of the invention.

It should be noted and understood that there can be improvements and modifications made of the present invention described in detail above without departing from the spirit or scope of the invention as set forth in the accompanying claims.

What is claimed is:

1. A computer implemented method of reservoir simulation of fluid flow in a producing reservoir with improved convergence of determining pressure distribution within the reservoir to determine fluid flow in the reservoir, the reservoir having rock having heterogeneous properties (permeability and porosity), the reservoir further being organized into a three dimensional grid of reservoir cells, the reservoir simulation being performed for a sequence of time steps based on fluid pressures from wells in the reservoir, the formation layers containing having rock having heterogeneous properties (permeability and porosity), the computer implemented method determining fluid flow from the three dimensional grid of reservoir cells to the wells and well production rates of the wells, the computer implemented method comprising the steps of:

(a) forming an initial measure of pressure distribution in individual ones of the grid cells of the reservoir for time steps of the reservoir simulation based on at least one of the heterogeneous rock properties and distances of the individual ones of the grid cells from wells in the reservoir according to the following equations:

$$P_L(x) = \frac{\left(\frac{a_r}{a_r + a_l}\right) q\mu x^* \left(e^{\sqrt{a_L}\,x} + e^{\sqrt{-a_L}\,x}\right)}{kA(e^{\sqrt{a_L}} + e^{\sqrt{-a_L}})\sqrt{a_L}} \text{ for } x \leq x^*$$

$$P_L(x) = \frac{\left(\frac{a_l}{a_r + a_l}\right) q\mu (L - x^*)\left(e^{\sqrt{a_R}\,(x-2)} + e^{\sqrt{-a_R}\,x}\right)}{kA(1 - e^{-2\sqrt{-a_R}})\sqrt{a_R}} \text{ for } x > x^*$$

and the following boundary conditions:

$$\frac{dp}{dx} = 0 \text{ at } x = 0; \text{ or } x = L$$

$$q = -\frac{kA}{\mu}\left(\frac{dp}{dx}\right) \text{ at } x = x^*$$

where:

$$x = \frac{x}{L}, \; x \leq x^*$$

$$x = \frac{x - x^*}{L - x^*}, \; x > x^*$$

$$a_l = \frac{\mu x^*\left(e^{\sqrt{a_L}} + e^{\sqrt{-a_L}}\right)}{kA(e^{\sqrt{a_L}} + e^{\sqrt{-a_L}})\sqrt{a_L}}$$

$$a_r = \frac{q\mu(L - x^*)\left(e^{\sqrt{a_R}} + 1\right)}{kA(1 - e^{-2\sqrt{-a_R}})\sqrt{a_R}}$$

$$a_R = \frac{\phi\mu c_t(L - x^*)^2}{k\Delta t}$$

$$a_L = \frac{\phi\mu c_t(x^*)^2}{k\Delta t}$$

and where:
q is well production or injection rate,
p is pressure,
k is absolute permeability of the reservoir rock,
A is cross sectional area perpendicular to flow,
μ is fluid viscosity, ϕ is porosity, x* is a location of a source of well production, L is length of porous media, Δt is length of time step, and $c_t$ is total pore compressibility;

(b) determining a pressure distribution in the individual ones of grid cells of the reservoir for a time step of the reservoir simulation based on the formed initial measure of pressure distribution in the individual ones of the grid cells of the reservoir;

(c) determining an estimated fluid flow rate in the grid cells of the reservoir for a time step of the reservoir simulation based on the determined an estimated pressure distribution in the grid cells of the reservoir;

(d) determining that the determined fluid flow rate in the grid cells of the reservoir has not converged; and (e) in response to determining that the determined fluid flow rate in the grid cells of the reservoir has not converged, by way of an iterative solver performing multiple iterations, repeating the steps of determining an estimated fluid flow rate in the grid cells of the reservoir for a time step of the reservoir simulation based on the determined an estimated pressure distribution in the grid cells of the reservoir until it is determined that the determined fluid flow rate in the grid cells of the reservoir has converged; and (f) in response to determining that the determined fluid flow rate in the grid cells of the reservoir has converged, ending the reservoir simulation of fluid flow in the grid cells of the reservoir.

2. The computer implemented method of claim 1, wherein permeability comprises at least one of the heterogeneous rock properties, and the step of forming an initial measure of pressure distribution in individual ones of the grid cells of the reservoir comprises:

forming a measure of pressure distribution in individual ones of the grid cells of the reservoir for time steps of the reservoir simulation based on a harmonically averaged permeability of the individual grid cells of the reservoir and distances of the individual ones of the grid cells from wells in the reservoir.

3. The computer implemented method of claim 1, wherein porosity comprises at least one of the heterogeneous rock properties, and the step of forming an initial measure of pressure distribution in individual ones of the grid cells of the reservoir comprises:

forming an initial measure of pressure distribution in individual ones of the grid cells of the reservoir for time steps of the reservoir simulation based on a pore volume averaged porosity of the individual grid cells of the reservoir and distances of the individual ones of the grid cells from wells in the reservoir.

4. The computer implemented method of claim 1, wherein the heterogeneous rock properties comprise permeability and porosity, and the step of forming an initial measure of pressure distribution in individual ones of the grid cells of the reservoir includes the step of:

forming an initial measure of pressure distribution in individual ones of the grid cells of the reservoir for time steps of the reservoir simulation based on: a harmonically averaged permeability of the individual grid cells of the reservoir; a pore volume averaged porosity of the individual grid cells of the reservoir; and distances of the individual ones of the grid cells from wells in the reservoir.

5. The computer implemented method of claim 1, wherein the forming an initial measure of pressure distribution is determined for each of x, y and z dimensions according to the following equations:

$$P_L(\bar{n}) = \frac{\left(\frac{a_r}{a_r + a_l}\right) q \mu n^* \left(e^{\sqrt{a_L}\,\bar{n}} + e^{\sqrt{-a_L}\,\bar{n}}\right)}{kA(e^{\sqrt{a_L}} + e^{\sqrt{-a_L}})\sqrt{a_L}} \text{ for } n \leq n^*$$

$$P_L(n) = \frac{\left(\frac{a_l}{a_r + a_l}\right) q \mu (L - n^*)\left(e^{\sqrt{a_R}\,(n-2)} + e^{\sqrt{-a_R}\,\bar{n}}\right)}{kA(1 - e^{-2\sqrt{-a_R}})\sqrt{a_R}} \text{ for } n > n^*$$

and the following boundary conditions:

$$\frac{dp}{dn} = 0 \text{ at } n = 0; \text{ or } n = L$$

$$q = -\frac{kA}{\mu}\left(\frac{dp}{dn}\right) \text{ at } n = n^*$$

where, n is an x, y or z location in the associated dimension, n* is the location of a source of well production or injection in the associated dimension of x, y or z, and where:

$$n = \frac{n}{L}, n \leq n^*$$

$$n = \frac{n - n^*}{L - n^*}, n > n^*$$

$$a_l = \frac{\mu n^*\left(e^{\sqrt{a_L}} + e^{\sqrt{-a_L}}\right)}{kA(e^{\sqrt{a_L}} + e^{\sqrt{-a_L}})\sqrt{a_L}}$$

$$a_r = \frac{q\mu(L - n^*)\left(e^{\sqrt{a_R}} + 1\right)}{kA(1 - e^{-2\sqrt{-a_R}})\sqrt{a_R}}$$

$$a_R = \frac{\phi \mu c_t (L - n^*)^2}{k\Delta t}$$

$$a_L = \frac{\phi \mu c_t (n^*)^2}{k\Delta t},$$

the pressure distribution in the individual ones of grid cells of the reservoir is determined as a product of the initial measure of pressure distribution in the x, y and z dimensions according to the following:

$p(x,y,z) = P_x(x) \cdot p_y(y) \cdot p_z(z)$.

* * * * *